Jan. 14, 1964 P. G. SMITH 3,117,809
HOSE AND FITTING CONSTRUCTION
Filed May 15, 1959
Fig. 1
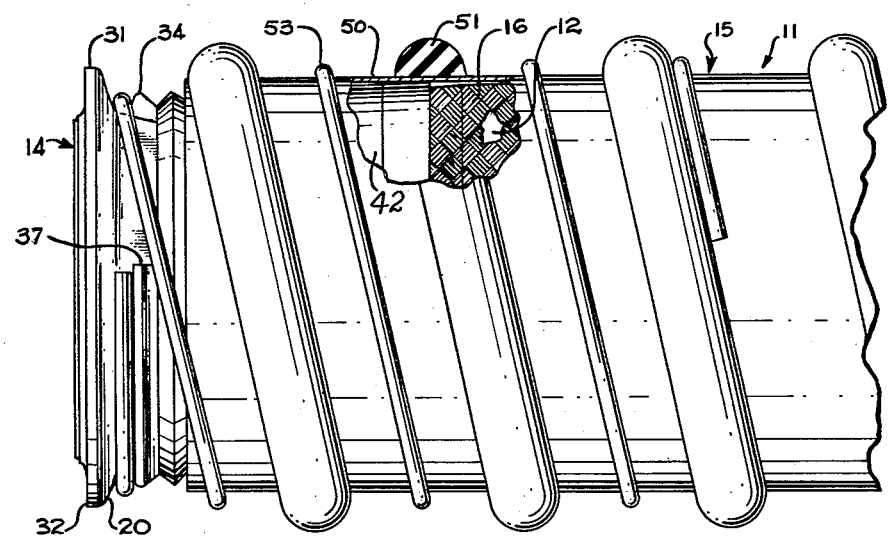
Fig. 3
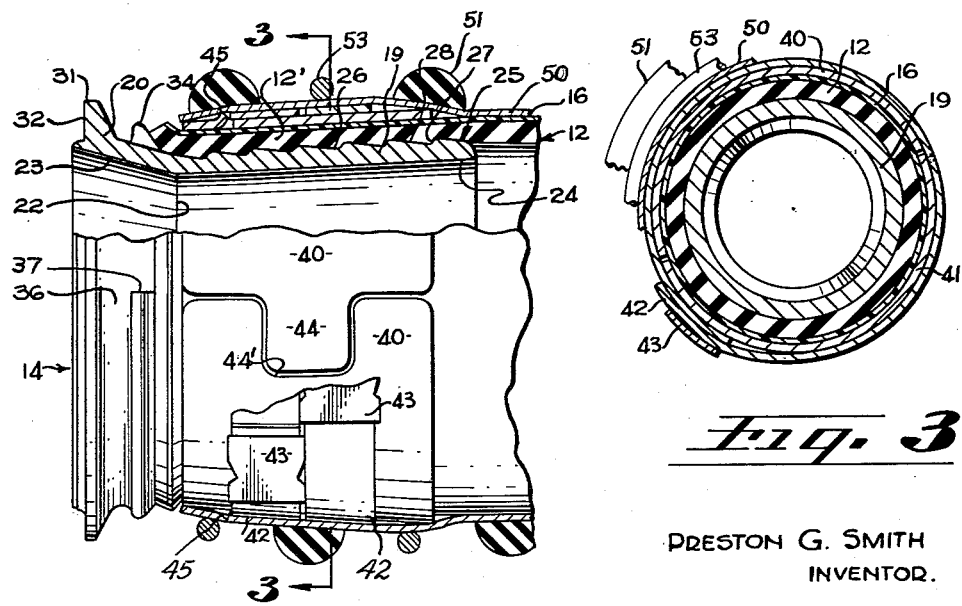
Fig. 2
PRESTON G. SMITH
INVENTOR.
BY
Moren & Graham
ATTORNEYS United States Patent Office 3,117,809
Patented Jan. 14, 1964

3,117,809
HOSE AND FITTING CONSTRUCTION
Preston G. Smith, La Crescenta, Calif., assignor to Airaterra, Glendale, Calif., a corporation of California
Filed May 15, 1959, Ser. No. 813,479
1 Claim. (Cl. 285—242)

This invention has to do generally with hose and hose couplings and particularly with hoses designed to carry fluids at elevated temperatures.

There are instances where flexible hoses are used to convey gases at temperatures considerably above normal atmospheric temperatures. One example is in the starting of jet aircraft engines in which a high velocity stream of air at a temperature of about 600° F. is conveyed to the engine through a flexible hose leading from the source of the high temperature air. Hoses commonly used for this purpose are made of a silicone type rubber, the body of the hose being reinforced on the exterior by a webbing or braiding of Dacron or other suitable structural material. Since the hoses must necessarily have metal fittings or adaptors at their ends for the purpose of connecting them to the aircraft and the source of supply, a difficulty has been that the metal fittings, being directly exposed to the high-temperature air being conveyed, conduct the heat directly to the reinforcement webbing or braiding on the exterior of the body of the hose, and, since Dacron and other materials used for the reinforcement are only serviceable at temperatures up to about 380° F., the reinforcement webbing soon fails.

Therefore, an object of the invention is to provide a novel means of mounting a fitting, such as an adaptor nipple or the like, upon the end of a flexible hose of the type above considered in a manner such that the heat of the conveyed fluid is not directly conducted to the outer reinforcement material of the hose body by the fittings.

Another object is to provide a novel means for mounting a fitting at the end of a flexible hose body which is easy to assemble and provides a tight, leakproof connection.

A further object is to provide a novel connection means which is of simple construction and can be readily manufactured.

A still further object is to provide a connection which will form a tighter and more substantial grip should there be any axial displacement of the hose on the hose end fitting.

Hoses of the type indicated as well as hoses used for other purposes, are often protected against abrasion by being provided with a "scuff" jacket comprising a fabric body having a helical external rib of resilient abrasiveresistant material. It is a further object of the invention to provide novel means for releasably securing such a jacket at its end to the fitting or adaptor at the end of the hose.

These and other objects will be apparent from the drawing and the following description. Referring to the drawing, which is for illustrative purposes only:

FIG. 1 is a fragmentary elevational view of the end portion of a hose fitted with a scuff jacket and embodying the invention;

FIG. 2 is a sectional elevational view of the hose of FIG. 1 on a somewhat larger scale and broken away in various parts to more clearly illustrate the construction; and FIG. 3 is a cross sectional view on line 3—3 of FIG. 2.

More particularly describing the invention, in FIG. 1 I show the end portion of a hose designated generally 11 which includes a hose body 12 and a metal fitting at its end in the form of an adaptor nipple 14. Surrounding the body of the hose is a scuff jacket 15 designed to protect the hose body against undue wear from abrasion.

Referring particularly to FIGS. 2 and 3, the hose body 12 is generally cylindrical when straight, preferably being formed of a heat-resistant rubber, synthetic rubber, or rubber-like material, silicone type rubber being commonly used for the purpose. The exterior of the hose body is shown provided with a reinforcing covering of fibrous material 16 and this may take the form of a webbing or braid such as shown, the material being partially embedded in the body of the hose. The reinforcement covering is conventionally made of a plastics, such as Dacron, and while the body of the hose is well adapted to withstand temperatures of several hundred degrees such as it may be subjected to in use in conveying air at temperatures as high as 600° F., the reinforcement covering on the exterior of the body of the hose, being made of a plastic, is usually incapable of withstanding temperatures in excess of about 380° F. without losing its effectiveness.

The fitting 14 in the end of the hose may be described as a metal nipple of truncated-conical tubular form, the nipple being circular in any plane normal to its axis. The body of the nipple is formed to provide a hose-mounting section 19 and a terminal section 20, the sections being shown as diverging toward the ends of the fitting, respectively, from a region in the plane of the line 22 formed by the intersection of two interior surfaces 23 and 24. The latter surfaces are conoidal or frusto-conical. The fitting shown has merely been one of several possible ones chosen to illustrate the invention since the terminal portion 20 might be a cylindrical threaded section or of other shape for attachment to a fitting, or the portion 20 might be elongated and of the same shape as section 19.

Exteriorly of the nipple, the outer surface 25 of the hose-mounting section 19 is provided with a series of annular grooves 26 defined by steep walls 27 and gently sloping walls 28, the surface 25 presenting a somewhat smoothly serrated profile as viewed in cross section. The exterior of the terminal portion 20 is provided with a main flange 31 having a forward or axially directed surface 32 against which sealing contact may be made with another fitting (not shown). Inwardly of the flange 31 is a lesser flange 34. Intermediate the two flanges is a groove 36. The flange 34 is interrupted (see FIG. 1) for a substantial circumferential distance leaving a gap 37 for a purpose which will be described later.

The end portion 12' of the hose body is telescoped over the hose-mounting section 19 of the nipple and clamped thereon by means of a pair of cuff members 40 and by encircling metal straps or bands 42. The members 40 are identical with complementary ends, each being semi-circular and provided with a tongue 44 at one side edge and with a recess 44' at the other, the parts being fitted about the hose body with the tongue of one cuff member in the recess of the other. The cuff members are loosely fitted relative to each other so that they can be tightened about the hose body to securely clamp the same and deform it into the exterior grooves 26 on the exterior of the nipple. Metal straps or bands 42 of conventional type are used about the cuff elements, being fastened in tightened condition by clips 43. The cuff element are tapered or conoidal to correspond to the general shape of the part of the fitting body about which they are mounted, but are of larger diameter. In order to prevent axial migration of the clamping straps 42, each cuff element is provided with a radially extending projection 45 which can be conveniently formed from the collar itself as shown. If desired rivets can be used in place of the struck projections 45.

With the construction described there is no direct contact between the fitting 14 and the exterior reinforcing material 16 on the hose body or that there is no direct conduction of heat to the reinforcing material except by means of the hose body 12 which is a very poor conductor of heat. Hence the reinforcing material is not subjected to harmful temperatures of the fluid carried and its efficiency is maintained.

Another feature of the invention is the means for retaining the scuff jacket 15 upon the hose body. The scuff jacket itself comprises a fabric sheath or tube 50 having a helical resilient bumper ridge 51 of rubber or the like extending about it. The end of the scuff jacket can be readily secured to the fitting 14 by means of a helical spring member 53 which can be threaded over the flange 31 of the fitting and through the interruption or gap 36 in the flange 34 and onto the scuff jacket into the position in which it is shown in FIG. 1, by merely rotating the spring. The scuff jacket is made long enough to cover and protect the clamp bands 42 and the cuff members 40.

Although I have illustrated and described a preferred form of my invention, I contemplate that various changes and modifications can be made therein without departing from the invention, the scope of which is indicated by the following claim. Also, I can further protect the reinforcement material 16 on the hose body from the heat of the fluid carried by the hose by coating the exterior, the interior, or both the exterior and interior of the fitting 14 with a layer of a substance having relatively poor heat conductivity, such as a ceramic or a silicone.

I claim:

In a hose and fitting construction, an elongated, flexible hose body formed of heat-resistant material, a reinforcement covering on said body of a plastics material having substantially less heat resistance than the material of the body, a tubular metal fitting received in the end portion of said hose body, said fitting being characterized by a conoidal portion within the hose body with its largest diameter at its inner end and having an annularly grooved outer surface, said fitting being further characterized by a flared mouth portion at its outer end projecting beyond the hose body, a pair of circumferentially overlapping and interfitting cuff members about the end portion of the hose body in which the fitting is received, said cuff members being flared correspondingly to the portion of the fitting received in the hose body, and strap means about said cuff members, said cuff members having means for preventing axial migration of the strap means in the direction of the smaller end of the cuff means, said reinforcement terminating short of any contact with the tubular metal fitting to prevent direct heat transfer to said reinforcement.

References Cited in the file of this patent

UNITED STATES PATENTS

| | | |
|---|---|---|
| 485,116 | Schmidt | Oct. 25, 1892 |
| 880,060 | Wood | Feb. 25, 1908 |
| 1,028,937 | Free | June 11, 1912 |
| 1,081,963 | Holloway | Dec. 23, 1913 |
| 1,249,038 | Dabney | Dec. 4, 1917 |
| 1,300,956 | Greve | Apr. 15, 1919 |
| 1,396,452 | Moesmer | Nov. 8, 1921 |
| 1,726,238 | Pipher | Aug. 27, 1929 |
| 1,745,295 | Greve | Jan. 28, 1930 |
| 1,802,499 | Chapman | Apr. 28, 1931 |
| 1,994,784 | Porzel | Mar. 19, 1936 |
| 2,102,010 | Kopp | Dec. 14, 1937 |
| 2,198,996 | Guarnaschelli | Apr. 30, 1940 |
| 2,361,816 | Blanchard | Oct. 31, 1944 |
| 2,568,414 | Russ | Sept. 18, 1951 |
| 2,652,093 | Burton | Sept. 15, 1953 |
| 2,738,993 | Wilson | Mar. 20, 1956 |